United States Patent
McDonough et al.

(10) Patent No.: US 7,336,640 B2
(45) Date of Patent: Feb. 26, 2008

(54) METHOD AND APPARATUS FOR CDMA DEMODULATION

(75) Inventors: John G. McDonough, La Jolla, CA (US); Jane Wang, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 934 days.

(21) Appl. No.: 10/370,352

(22) Filed: Feb. 19, 2003

(65) Prior Publication Data

US 2003/0156593 A1 Aug. 21, 2003

Related U.S. Application Data

(60) Provisional application No. 60/357,894, filed on Feb. 19, 2002.

(51) Int. Cl.
*H04J 13/00* (2006.01)
(52) U.S. Cl. .................. 370/342; 375/147
(58) Field of Classification Search ............. 370/342; 375/147, 148, 150
See application file for complete search history.

(56) References Cited

U.S. PATENT DOCUMENTS

| | | | |
|---|---|---|---|
| 6,424,631 B1* | 7/2002 | Czaja et al. | 370/252 |
| 7,149,240 B2* | 12/2006 | McDonough et al. | 375/146 |
| 2003/0103447 A1* | 6/2003 | Thorson et al. | 370/209 |
| 2004/0184513 A1* | 9/2004 | Lundby et al. | 375/148 |

* cited by examiner

*Primary Examiner*—Melvin Marcelo
(74) *Attorney, Agent, or Firm*—Dolly Y. Wu; W. James Brady; Frederick J. Telecky, Jr.

(57) ABSTRACT

A CDMA receiver (500) minimizes the use of hardware by taking advantage of the fact that Walsh sequences of a predetermined length (e.g., 16) are comprised of inverted and non-inverted versions of smaller length (e.g., 4) sequences. The receiver (500) performs the necessary uncovering operations for example of a Walsh sequence of length 16 by performing uncovering operations using smaller length Walsh sequences such as of length 4 and then performing subsequent summing operations with inverted and non-inverted versions of the results of such uncovering operations.

11 Claims, 4 Drawing Sheets

METHOD AND APPARATUS FOR CDMA DEMODULATION

CROSS-REFERENCE TO RELATED APPLICATIONS

This application is a non-provisional application claiming priority to provisional application Ser. No. 60/357,894 filed on Feb. 19, 2002, entitled "Method and Apparatus for Efficient CDMA Demodulation".

FIELD OF THE INVENTION

The present invention relates in general to wireless communications and more particularly, to a method and apparatus for performing Code Division Multiple Access (CDMA) demodulation.

BACKGROUND OF THE INVENTION

In spread spectrum communication systems, such as CDMA communication systems, pseudorandom noise (PN) sequences are used to generate spread spectrum signals by increasing the bandwidth (i.e., spreading) of a baseband signal. A forward link waveform transmitted by a base station to a handset may be comprised of a pilot waveform and a data waveform. Both of the waveforms are received with the same relative phase and amplitude distortions introduced by the channel. The pilot waveform is an unmodulated PN sequence that aids in the demodulation process, this is known in the art as "pilot-aided demodulation."

Conventional pilot-aided demodulation methods typically include the steps of: demodulating the pilot waveform; estimating the relative phase and amplitude of the pilot waveform; correcting the phase of the data waveform using the estimated phase of the pilot waveform; weighting data symbols from each demodulation element in a RAKE receiver according to the estimated amplitude of the pilot waveform; and combining the weighted data symbols together. The three steps of phase correction, amplitude weighting and combining are typically performed as a "dot product" as is well known in the art. A controller having a central processing unit (CPU) and/or a digital signal processor (DSP) may perform some of the above-described steps.

Referring now to FIG. 1, there is shown a conventional CDMA receiver 100 such as those used in IS-95A or TIA/EIA-95-B compliant systems. Transmitted signals are accepted as analog information, and converted into digital I (in-phase) and Q (quadrature phase) sample stream by analog-to-digital (A/D) converter 102. A multi-finger RAKE receiver is then used to variably delay and amplify multipath delays found in the sample stream, so that degradation due to fading can be minimized. In this example, the RAKE receiver includes three demodulating fingers, demodulating finger 1 (104), demodulating finger 2 (106), and demodulating finger 3 (108) all receive the same I and Q sample stream, which has been represented as a single line for simplicity.

Each demodulating finger is assigned one of the sample stream multipath delays by a controller (not shown). PN codes and Walsh codes are generated with delays consistent with the multipath delays of the sample stream that is to be demodulated. The sample stream from the multipaths is then coherently combined in combiner 110 using a technique such as Maximal Ratio Combining (MRC). A searcher 112 processes the received samples to find the existence of a pilot signal and estimate the strength of the pilot, as well as manage information on finger status, etc.

Modern CDMA communication systems provide higher rates of data transmission through the use of code channel aggregation. CDMA receivers use a plurality of demodulators in order to demodulate the aggregated code channels. Typically one demodulator is used for each code channel that is being processed. In FIG. 2, there is shown a partial block diagram of a prior art receiver structure for one of these code channels, a typical receiver would have a plurality of these demodulator structures. In this prior art receiver section, one demodulator is required for each channel. Each of the received I and Q samples 202 (only one code channel receiving data path, I or Q, is shown to simplify the discussion) is despread and uncovered with the appropriate PN and Walsh codes in order to get a fully demodulated symbol for this particular code channel. After the fully demodulated symbol is acquired, channel estimation is performed. MRC is then preformed on the multiple diversity branches 204 or the receiver, where each of the symbols is multiplied by a weight factor that is proportional to the signal amplitude. After MRC is performed on the multiple branches, conventional descrambling, further processing and channel decoding is performed.

In FIG. 3, there is shown a partial block diagram of a prior art receiver structure like the one shown in FIG. 2, that shows how data symbols of each of sixteen aggregated code channels ($W_0 16$-$W_{15} 16$) paths are demodulated, formed and sent to a channel decoder for further processing. While in FIG. 4, there is shown a prior art receiver section used for the demodulation of sixteen aggregated code channels (e.g., $W_2^{16}$-$W_{15}^{16}$ are used for 1XTREME compliant systems).

As the demands on wireless CDMA handsets for more features and improved battery life keeps intensifying, a method and apparatus which can efficiently demodulate aggregate code channels by taking advantage of the inherent structure of, and relationship between, such aggregated code channels would be very beneficial in the art. It would be further beneficial if such method and apparatus would help reduce the hardware complexity and therefore the cost, power and space requirements of a CDMA receiver.

BRIEF DESCRIPTION OF THE DRAWINGS

A more complete understanding of the present invention may be derived by referring to the detailed description and claims when considered in conjunction with the following figures.

DETAILED DESCRIPTION OF A PREFERRED EMBODIMENT

It should be appreciated that the particular implementations shown and described herein are illustrative of the invention and its best mode and are not intended to otherwise limit the scope of the invention in any way.

Figure 1:
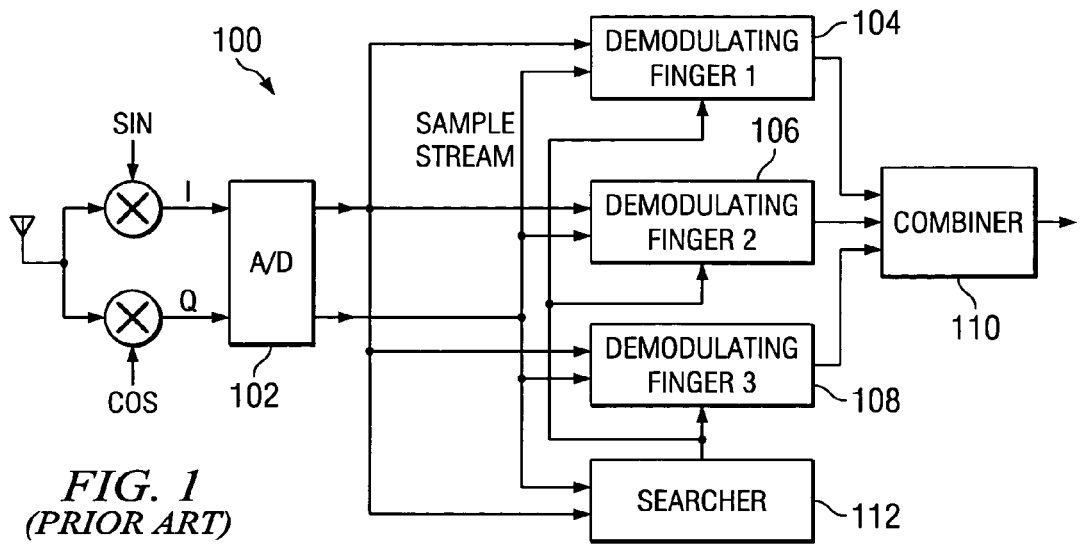
FIG. 1 is a partial block diagram of a prior art receiver.
Figure 2:
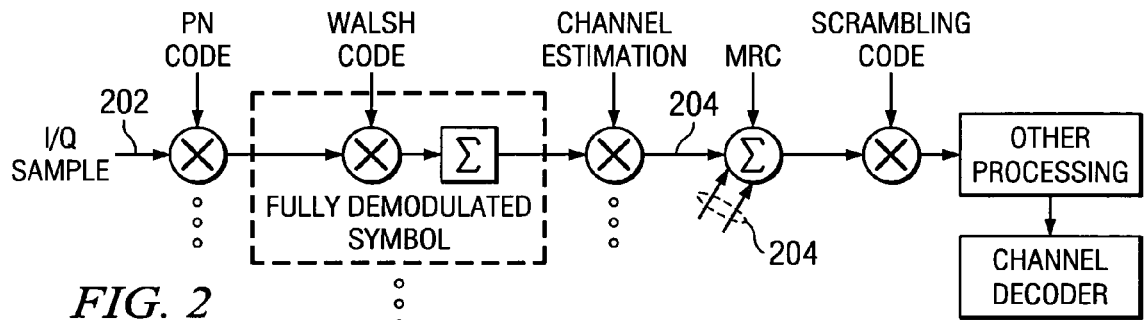
FIG. 2 is a partial block diagram of a prior art receiver.
Figure 4:
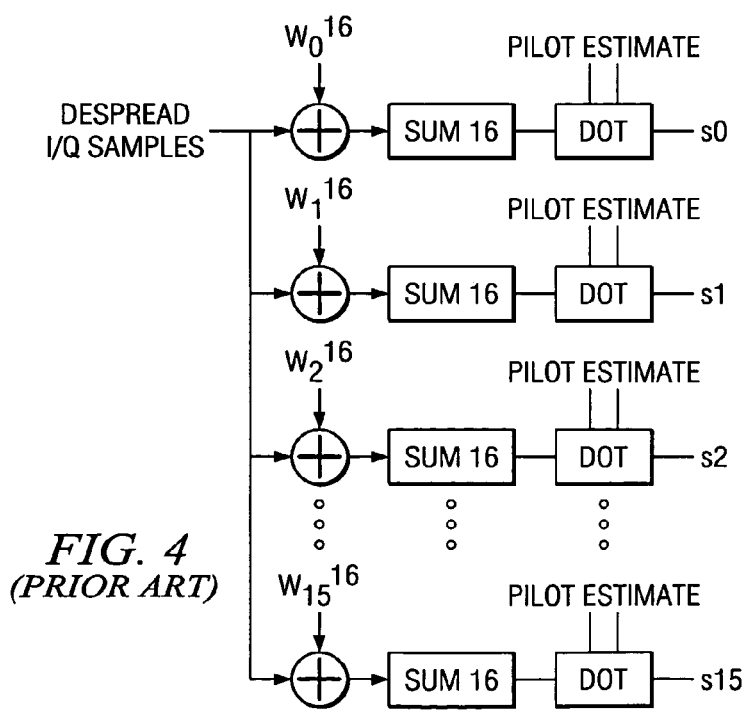
FIG. 4 is a partial block diagram of a prior art receiver section for demodulating sixteen code channels
Figure 3:
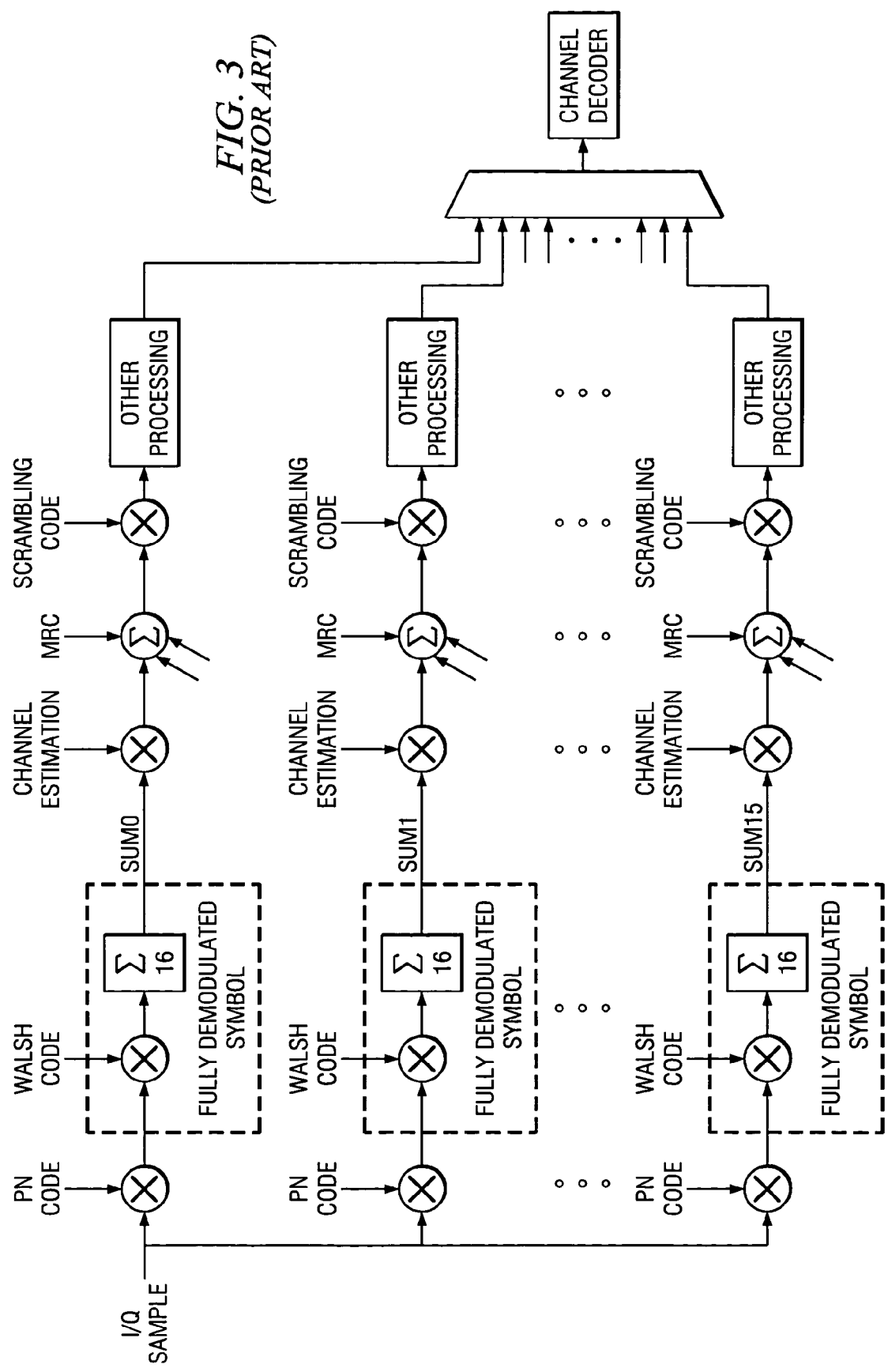
FIG. 3 is a partial block diagram of a prior art receiver section.
Figure 5:
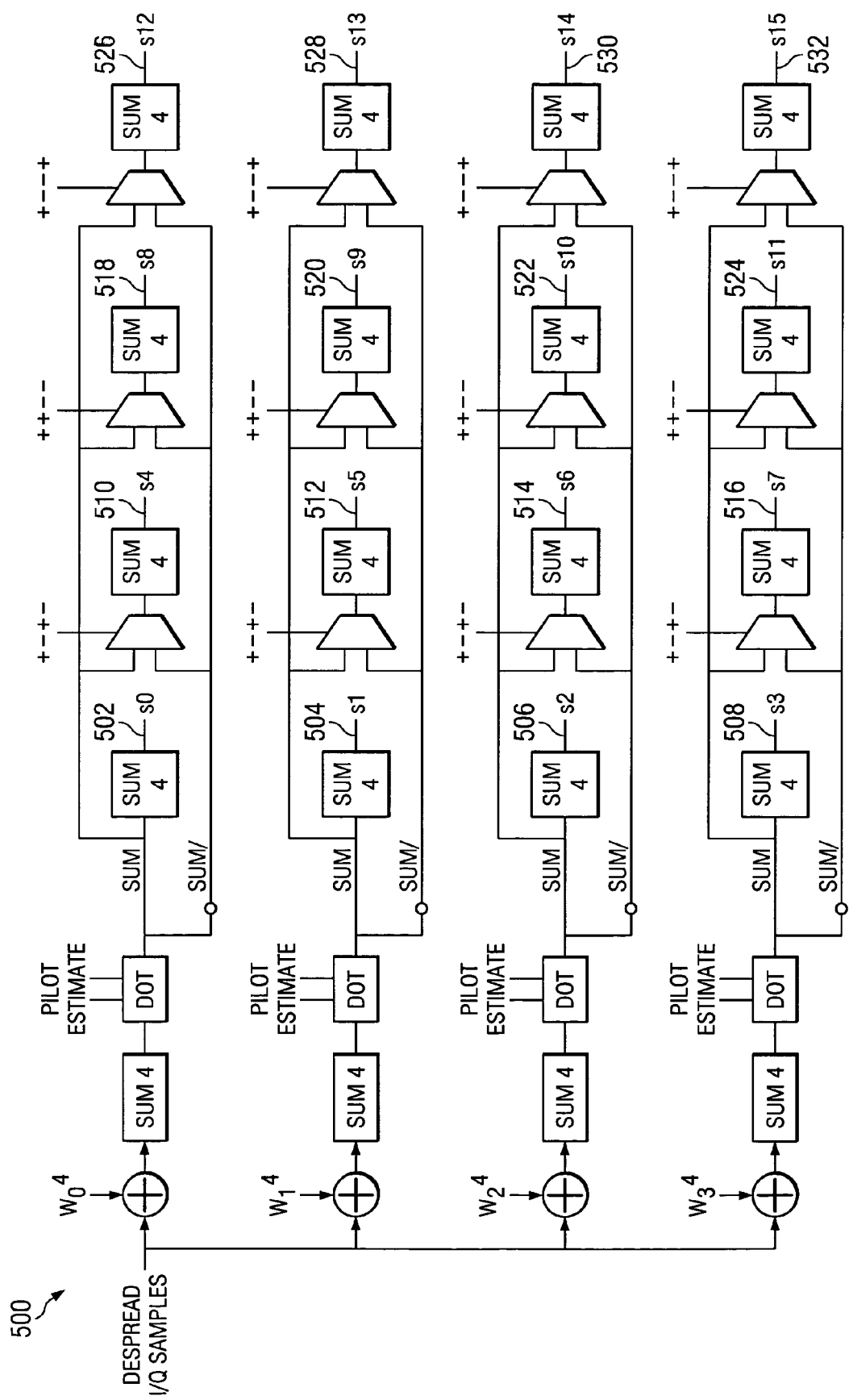
FIG. 5 is a partial block diagram of a receiver section in accordance with the invention.

Referring now to FIG. 5, there is shown a partial block diagram of a CDMA receiver 500 in accordance with the present invention. Receiver 500 generates the same results as the prior art receiver sections previously discussed but requires less hardware to implement. In the illustrative example shown, despread I/Q samples contain 16 information sequences, each covered by a different Walsh sequence (e.g., $W_0^{16}$ through $W_{15}^{16}$). The prior art circuits such as that shown in FIG. 4 each perform 16 parallel uncovering and integration operations to recover the information sequence from the despread I/Q samples. This can be compared to CDMA receiver 500 of the present invention, which performs only four uncovering operations in the illustrated example discussed above and then uses the results of these uncovering operations to generate the desired output.

Table 1 below shows an illustrative example of the relationship between sixteen Walsh sequences of length sixteen and the four Walsh sequences of length four in accordance with the invention. Assuming that HX=X by X Hadamard Matrix, and that $WY=W_Y^4$ and WY16=row Y of H16 then for example:

TABLE 1

| H4 = | W0 | and | H16 = | W0 W0 W0 W0 |
|---|---|---|---|---|
| | W1 | | | W1 W1 W1 W1 |
| | W2 | | | W2 W2 W2 W2 |
| | W3 | | | W3 <u>W3</u> W3 <u>W3</u> |
| | | | | W0 <u>W0</u> W0 <u>W0</u> |
| | | | | W1 <u>W1</u> W1 <u>W1</u> |
| | | | | W2 <u>W2</u> W2 <u>W2</u> |
| | | | | W3 W3 <u>W3</u> <u>W3</u> |
| | | | | W0 W0 <u>W0</u> <u>W0</u> |
| | | | | W1 W1 <u>W1</u> <u>W1</u> |
| | | | | W2 W2 <u>W2</u> <u>W2</u> |
| | | | | W3 <u>W3</u> <u>W3</u> W3 |
| | | | | W0 <u>W0</u> <u>W0</u> W0 |
| | | | | W1 <u>W1</u> <u>W1</u> W1 |
| | | | | W2 <u>W2</u> <u>W2</u> W2 |
| | | | | W3 W3 W3 W3 |

Because each Walsh sequence of length sixteen is comprised of inverted and non-inverted versions of one of the four Walsh sequences of length four, uncovering operations using Walsh sequences of length sixteen may be performed by performi ng uncovering operations using Walsh sequences of length four and then performing subsequent summing operations using inverted and non-inverted versions of the results of the uncovering operations.

Receiver section 500 includes uncovering circuit(s) that perform all four uncovering operations using Walsh sequences of length four. Each of the sixteen desired results corresponding to the results of the uncovering operations using the Walsh sequences of length sixteen are then generated by summing over four intervals using either an inverted or a non-inverted version of the result of the uncovering operation of the appropriate related Walsh sequence, yielding results $S_0$-$S_{15}$ (502-532).

Figure 6:
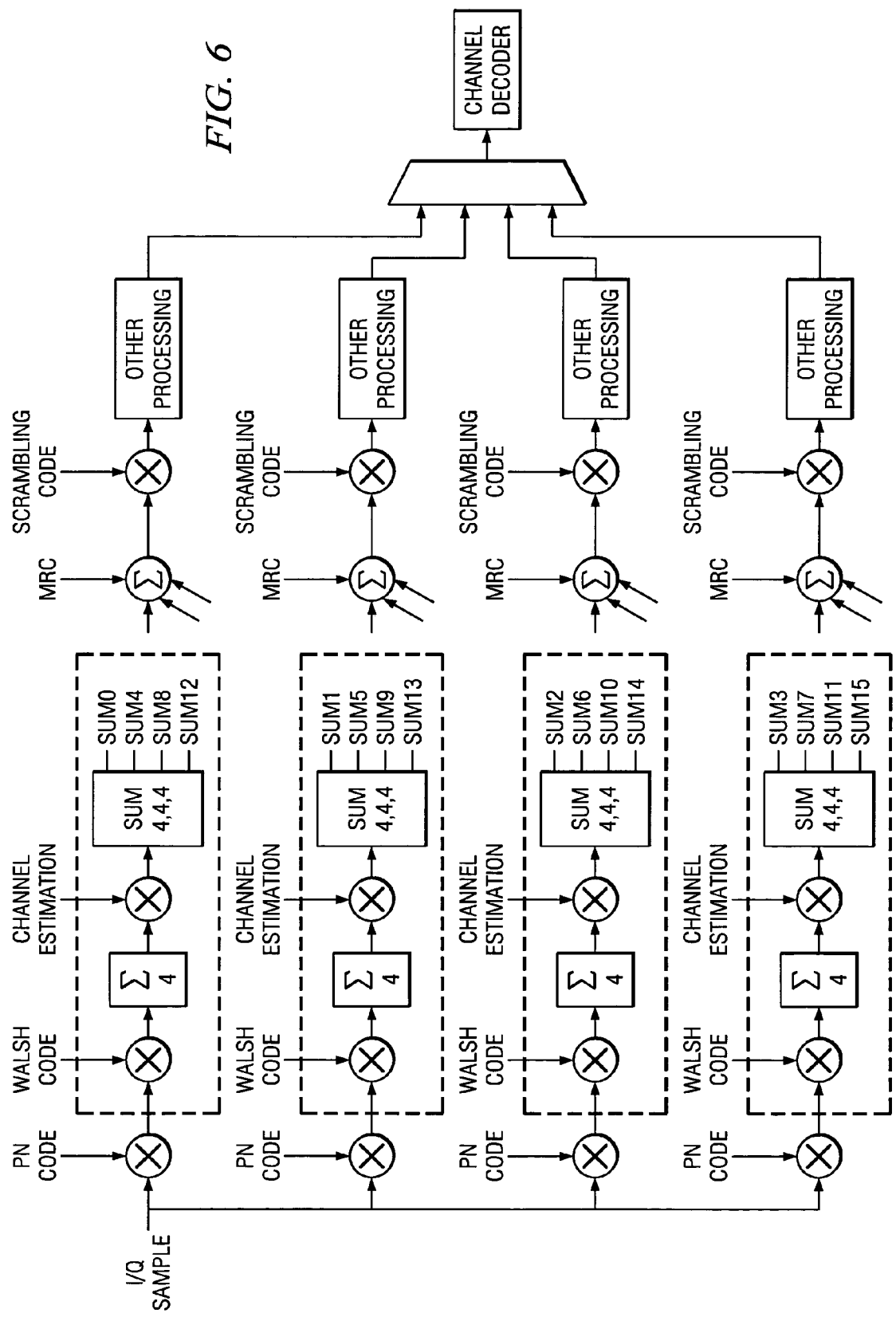
FIG. 6 is a partial block diagram of a receiver section in accordance with the invention.

For example, the result of the uncovering operation using the Walsh sequence $W_{15}^{16}$, is generated by respectively summing a non-inverted, an inverted, an inverted and then a non-inverted version of the result of the uncovering operation of the related Walsh sequence (i.e., $W_3^4$). Receiver section 500 uses less hardware than used in the receiver section shown in FIG. 4, thus resulting in lower costs, less space requirements and less power consumption than the prior art receiver sections described. In FIG. 6 there is shown the receiver section shown in FIG. 5 and further including the MRC and other blocks used in the receiver path.

In order to further understand the present invention, a brief mathematical analysis assuming $R_i$ is the received chip level complex baseband signal, Ci is the complex short PN sequence, $W^N_n(i)$ is the Walsh code with length N and index n, and $S_i$ is the de-spread complex data symbol follows. After being short PN despread, Walsh uncovered, de-skewed and maximum-ratio combined for different multipath and being long PN de-scrambled, the complex data symbol becomes $$S_k = (\Sigma_j w_j * (\Sigma_i (R_i * C_i')* \ W^N_n(i)))* \ L_k \ \ i=0 \ldots I-1,$$
$$j=0 \ldots J$$

where I is the number of chips per symbol, J is the number of multipaths, $w_j$ is the weighting factor for the MRC, and $L_k$ is the long PN code symbols.

In accordance with the invention, Walsh codes with length N (where N is 2-th power) can be generated from $W^M_0$ (where M is less than $2^{log_2(N)-1}$) having a length N/M when the original Walsh length ("N") is even. It can be generated from $W^M_1$ (where M is less than $2^{log_2(N)-1}$) having a length N/M when the original Walsh length is odd. For example, $W^{512}_{2n}$ can be generated by $W^{16}_0$ and $W^{32}_n$, while $W^{256}_{2n+1}$ can be generated by $W^{16}_1$ and $W^{32}_n$. As a result, $S_k$ can be expressed as $$Sk = (\Sigma_j w_j * (\Sigma_i (R_i * C_i') * W^N_n(i))) * L_k =$$
$$(\Sigma_j w_j * (\Sigma_q (\Sigma_p (R_p * C_p') * W^M_m(p)) * W^{N/M}_n(q))) * L_k =$$
$$\Sigma_q ((\Sigma_j w_j * (\Sigma_p (R_p * C_p') * W^M_m(p))) * L_k) * W^{N/M}_n(q)$$

where m is 0 for odd N and 1 for even N, n is (m−1)/2 for odd N and m/2 for even N.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention.

What is claimed is:

1. A code division multiple access (CDMA) receiver, comprising:
   an input for receiving an information sequence covered by a Walsh sequence of length N;
   a demodulator with an uncovering circuit coupled to the input for uncovering the information sequence using a Walsh code, $W^m_0$, where M is less than $2^{log_2(N)-1}$ and having a length N/M when the Walsh length, N, is even, and using a Walsh code, $W^M_1$, here M is less than $2^{log_2(N)-1}$ having a length N/M when the Walsh length, N, is odd; and
   wherein the CDMA receiver demodulates the information sequence to provide an output from the uncovering circuit to accomplish CDMA communications.

2. A CDMA receiver as defined in claim 1, wherein the uncovering circuit further includes one or more summers for summing non-inverted and/or inverted versions of the result of the uncovering operation using the Walsh code.

3. A CDMA receiver as defined in claim 1, wherein the input receives N information sequences and the CDMA receiver uses M uncovering circuits in order to fully uncover all of the N information sequences.

4. A CDMA receiver as defined in claim 3, wherein the results of the M uncovering circuits are combined.

5. A CDMA receiver as defined in claim 4, wherein the results of the M uncovering circuits are combined using a Maximal Ratio Combining (MRC) circuit.

6. A method for code division multiple access (CDMA) demodulation, comprising the steps of
receiving an information sequence covered by a Walsh sequence of length N; and
uncovering the information sequence using a Walsh code, $W^M_0$, where M is less than $2^{log_2(N)-1}$ and having a length N/M when the original Walsh length, N, is even, and using a Walsh code, $W^m_1$, here M is less than $2^{log_2(N)-1}$ and having a length N/M when the original Walsh length, N, is odd;
demodulating the information sequence to provide an output from the uncovering step to accomplish CDMA communications.

7. A method as defined in claim 6, further comprising the step of: summing non-inverted and/or inverted versions of the result of the uncovering operation using the Walsh code.

8. A method as defined in claim 6, wherein the uncovering is performed by an uncovering circuit and if N information sequences are received, M uncovering circuits are used in order to fully uncover all of the N information sequences.

9. A method as defined in claim 8, wherein the results of the M uncovering circuits are combined.

10. A method as defined in claim 9, wherein the results of the M uncovering circuits are combined using a Maximal Ratio Combining (MRC).

11. A code division multiple access (CDMA) receiver with a demodulator, comprising:
a chip with an input for receiving an information sequence covered by a Walsh sequence of length N;
the demodulator for performing only uncovering operations with an uncovering circuit coupled to the input and using the results of the uncovering operations to generate an output;
wherein the chip demodulates the information sequence to provide the output to accomplish CDMA communications; and
wherein the Walsh sequence of N comprises inverted and non-inverted versions of one of the M Walsh sequences, and uncovering operations is performed on Walsh sequences of M and then subsequent summing operations is performed using inverted and non-inverted versions of the uncovering operations.

* * * * *